Aug. 26, 1941.   R. L. TWEEDALE   2,253,663
POWER TRANSMISSION
Filed Oct. 15, 1938
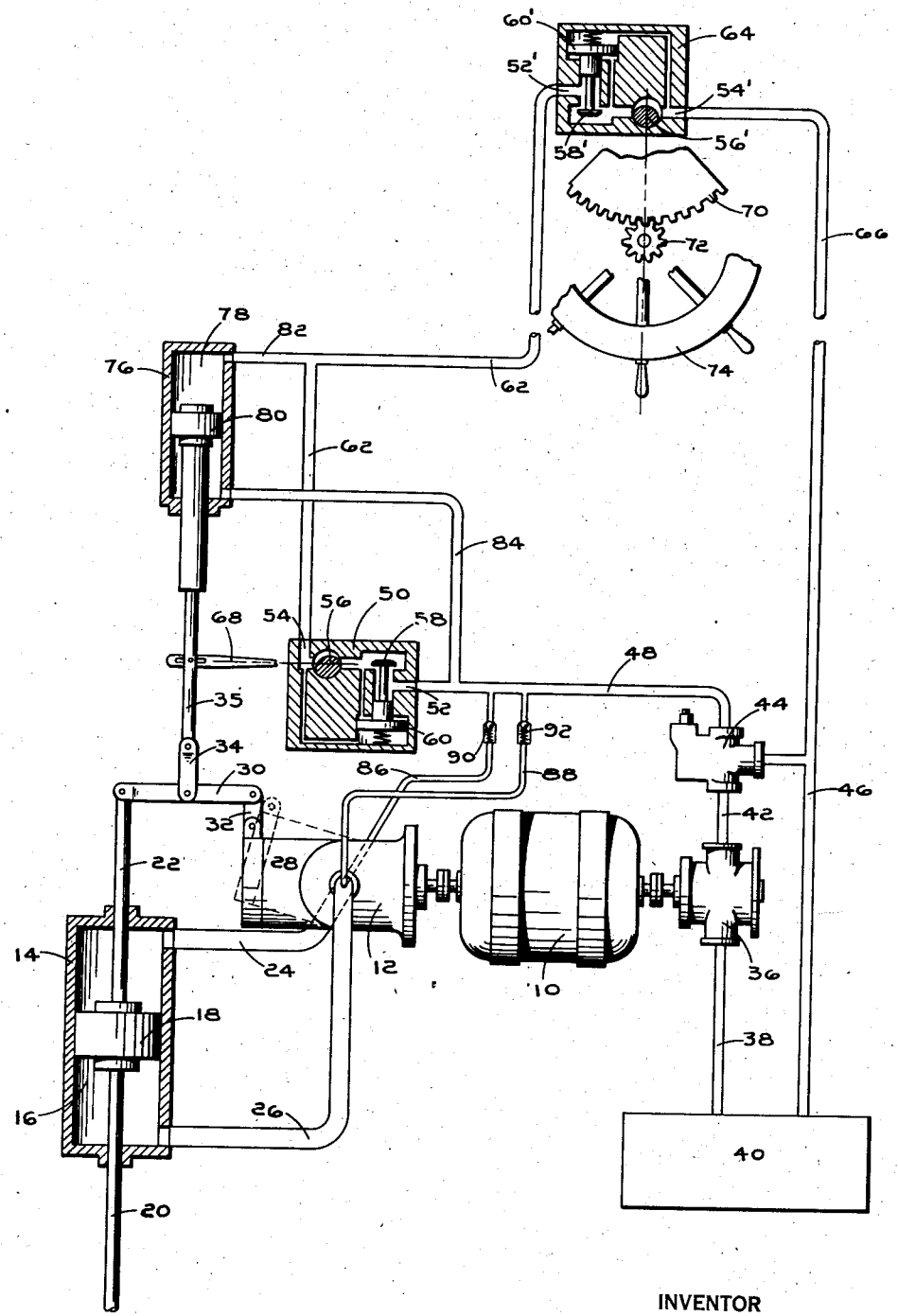
INVENTOR
Ralph L. Tweedale Patented Aug. 26, 1941

2,253,663

UNITED STATES PATENT OFFICE 2,253,663

POWER TRANSMISSION

Ralph L. Tweedale, Detroit, Mich., assignor to Vickers Incorporated, Detroit, Mich., a corporation of Michigan Application October 15, 1938, Serial No. 235,116

3 Claims. (Cl. 60—52)

This invention relates to power transmissions, particularly to those of the fluid pressure operated type wherein the position of a movable member may be controlled in accordance with the position of a control element which may be located at a distance from the movable member.

It is an object of the invention to provide a remotely controlled, power-operated, servo-motor for controlling such a movable member, as for example, the displacement regulator of a variable displacement pump or other fluid pressure energy translating device, in which precisely controlled follow-up action between the movements given to the control element and the movements thereby imparted to the movable member may be achieved without requiring mechanical connection between the control element and the mechanism operating the member.

In fluid pressure energy translating devices of the type comprising a pump and a motor, one of which includes mechanism for varying its displacement, it is frequently desirable to operate the displacement regulator from a distance and in such cases it is necessary that the control element must so operate as to insure that the position of the displacement regulator always corresponds precisely to any position given to the control element. It is likewise necessary, particularly when large machines are subject to either manual control or to automatic control from a device capable of exerting very small forces, to provide a servo-motor for supplying the necessary force to actuate the displacement regulator. Where the control element is adjacent the displacement regulator and the servo-motor, it is a simple matter to insure precise follow-up control by the use of a mechanical connection of some sort between the servo-motor and the control element. In situations where it is impractical to run a mechanical connection from the servo-motor to the control element, various types of electric or hydraulic telemetric connections have heretofore been utilized in place of a direct mechanical connection. The use of devices of this character involves not only complicated and expensive apparatus but is frequently subject to derangement due to the difficulty of maintaining a constant phase relation between the input and output elements of the telemetric connection. This is particularly true with hydraulic telemetric devices heretofore used, where the inherent and unavoidable leakage, expansion and contraction of transmission fluid due to temperature changes, etc., prevent the output member of the telemotor from exactly following the movements of the input member.

It is an object of this invention therefore to provide a simple and reliable remote control for a movable member in which power operation of the movable member with a follow-up action is provided which is not subject to the difficulties enumerated above and which is independent of unavoidable leakages as well as unavoidable variations in the working pressure of the fluid used to operate the system.

Further objects and advantages of the present invention will be apparent from the following description, reference being had to the accompanying drawing wherein a preferred form of the present invention is clearly shown.

In the drawing the single figure is a diagrammatic view of a preferred form of the present invention.

In the form selected for illustration the invention is applied to an electro-hydraulic marine steering gear. A steering gear of this type is illustrated, diagrammatically as comprising an electric motor 10, a reversible, variable displacement pump 12, and a double-acting fluid motor 14 comprising a cylinder 16 and a piston 18 having rods 20 and 22. Rod 20 may be connected to the rudder, not shown.

Conduits 24 and 26 connect the pump 12 and motor 14. The pump illustrated is of the type having a swinging yoke 28 shown by solid lines in its neutral position in which no fluid is pumped to either conduit 24 or 26. When the yoke is swung upwardly as shown by dotted lines, fluid will be delivered to one of the conduits, 26, for example, and withdrawn from the conduit 24. Likewise, when the yoke is swung downwardly below neutral position, fluid will be pumped in the opposite direction, the rate of delivery in either case being proportional to the angular displacement of the yoke away from neutral position.

A well-known type of follow-up control mechanism is illustrated as comprising the floating lever 30, the left-hand end of which is pivotally connected to the piston rod 22 while the right-hand end thereof is connected to the yoke 28 by a link 32. Pivoted to the floating lever 30 at its mid portion is a link 34 which connects to a siding control rod 35.

The operation of this portion of the mechanism is such that whenever the control rod 35 is moved to a new position, the piston 18 at first remains stationary, causing the yoke 28 to be swung out of neutral position, thereby delivering fluid to operate the piston 18 in a direction opposite to the movement imparted to the control rod 35. This resulting movement of the piston 18 while the control rod 35 remains stationary causes the yoke 28 to be swung back to neutral position by means of the floating lever 30. Thus the piston 18 follows exactly the movements imparted to the control rod 35.

The mechanism thus far described is well known in the art and typifies one class of mechanism to which the present invention may be applied to advantage.

In a marine installation all the mechanism thus far described may without difficulty be located in closely spaced relationship in the after part of the ship adjacent the rudder. It is necessary, however, that the control rod 35 be connected up to the ship's steering wheel which is usually at some distance from the after part of the ship.

The present invention aims to provide a reliable power-operated, remotely controlled servomotor for the purpose of controlling the position of the control rod 35 from a distance through the medium of fluid conduits alone. For this purpose there is provided an auxiliary pump 36 which may conveniently be driven by the motor 10 and which has a suction conduit 38 through which fluid is withdrawn from a reservoir 40.

A delivery conduit 42 is provided with the usual relief valve 44 for bypassing fluid to the tank through a return conduit 46 whenever a predetermined pressure is exceeded in the conduit 42. From the relief valve 44 a delivery conduit 48 leads to a flow rate controller 50 of well-known construction capable of maintaining a constant but adjustable rate of flow through the device from the inlet port 52 to the outlet port 54 thereof.

Preferably the device 50 comprises an adjustable orifice 56 together with a hydrostatic valve 58 under the control of a piston 60. The piston 60 is subjected to the pressure ahead of the orifice 56 on its upper face and to the pressure beyond the orifice on its lower face so that the valve 58 is caused to open or close the required amount to maintain a constant drop in pressure through the orifice 56 regardless of pressure variations at the port 54. There is thus provided in the device 50 between the ports 52 and 54 a pilot circuit portion in which the rate of flow may be varied in accordance with predetermined conditions. From the port 54 a conduit 62 leads to the inlet port 52' of a second flow rate controller 64 which may be identical to the controller 50. From the outlet port 54' of the controller 64 a conduit 66 connects to the return conduit 46. There is thus provided in the flow controller 64 a second pilot circuit portion the rate of flow through which is also variable in accordance with predetermined conditions.

The orifice 56 has a control handle 68 which is connected by a pin and slot connection to the control rod 35 whereby the rate of flow through the device 50 is varied in accordance with the position of the control rod 35. The orifice 56' is connected by a gear segment 70 and pinion 72 to the steering wheel 74. Thus the rate of flow through the controller 64 may be varied in accordance with the position of the steering wheel or controlling element 74.

For the purpose of operating the control rod 35 a differential piston fluid motor 76 is provided comprising a cylinder 78 and a differential piston 80. The head end of the cylinder 78 is connected by a branch conduit 82 to the conduit 62. The rod end of the cylinder 78 is connected to the pump discharge conduit 48 by a branch conduit 84.

Preferably the auxiliary control circuit is utilized for supercharging or forced replenishing of the circuit of the pump 12. For this purpose branch conduits 86 and 88 lead to the conduits 24 and 26 respectively. Suitable check valves 90 and 92 are provided for preventing escape of fluid from the discharge side of the pump 12 to the line 48 while permitting fluid to flow into the suction side of the pump.

The operation of the device will best be understood if the conditions when the device is in equilibrium are first described. Thus, with the motor 10 operating driving the pumps 12 and 36 and with the other parts in their normal positions under equilibrium conditions, the pump 36 delivers fluid to the conduit 42 somewhat in excess of the maximum rate of flow permitted through the flow controller 50 when orifice 56 is at its maximum opening. The remainder of the fluid not needed to replenish the circuit of pump 12 is bypassed over the relief valve 44 and returns to the tank 40 through conduit 46. Under equilibrium conditions the adjustment of controller 64 is the same as that of the controller 50. Thus fluid passes through controller 50 from port 52 to port 54 and through conduit 62 to the controller 64 through which it passes into the conduit 66 and out to the tank 40.

Since the settings of both flow controllers are equal, the same quantity will pass through controller 64 as that which passes through controller 50 so that there will be no flow either into or out of the head end of cylinder 78 through the branch conduit 82. This is the condition when the device is in equilibrium.

During the momentary periods while the steering wheel 74 is being turned and very slightly thereafter the action is as follows:

If it be assumed that the steering wheel be turned in a direction tending to close off the orifice 56' the rate of flow through controller 64 will be decreased. As yet, however, the rate of flow through controller 50 remains the same as before so that there is an excess of fluid delivered into conduit 62 over and above the quantity which escapes therefrom through the controller 64. This excess passes through the branch conduit 82 to the head end of cylinder 78 and causes the piston 80 to move downwardly. The fluid discharged from the rod end of cylinder 78 passes out of the conduit 84 and over the relief valve 44.

As the piston 80 moves downwardly the control rod 35 is carried along therewith and the lever 68 is operated tending to close off the orifice 56. This downward movement of the piston 80 continues until the orifice 56 has been closed off to the same extent as the orifice 56' was closed off by movement of the steering wheel 74. Thus it will be seen that the piston 80 and control rod 35 may be moved downwardly by operation of the steering wheel 74 and that this movement will continue so long as the controller 64 is adjusted to pass less fluid than is the controller 50. As soon as their adjustments become equal the downward movement of piston 80 stops and equilibrium is again established.

If the steering wheel be turned in the opposite direction to increase the opening of orifice 56', the opposite action will result. Accordingly since fluid is permitted to escape through controller 64 at a greater rate than it enters the conduit 62 through controller 50, the difference will be made up by fluid discharged from the head end of cylinder 78 through conduit 82 and piston 80 will move upwardly under the constant pressure exerted in the rod end of cylinder 78 through conduit 84. In thus moving upwardly piston 80 will carry with it the lever 68, thus increasing the opening of orifice 56 until this opening becomes equal to the opening at controller 64. When this occurs, no further upward movement can take place and equilibrium conditions are again established. It will thus be seen that the control rod 35 will follow the movements imparted to the steering wheel 74 in a true follow-up fashion although the only connection between motor 76 and steering wheel 74 consists of two conduits 62 and 66.

As previously explained the piston 18 follows the movements of control rod 35 in the well-known manner. It will be understood, of course, that the remotely controlled follow-up servo-motor construction may be utilized for operating other load devices than the control rod 35 and that the applicability thereof is not limited to the electro-hydraulic steering gear selected for illustration.

In an application where the resisting effort which the piston 80 has to overcome is equal in both directions, it is preferred to make the effective area at the rod end of the piston 80 equal to half the effective area at the head end thereof. With this proportioning it then follows that the equilibrium pressure in conduits 48 and 84 is twice the equilibrium pressure in conduits 62 and 82 so that one-half the pressure drop in the pilot control circuit occurs at the controller 50 while the other half occurs at the controller 64 under equilibrium conditions. Should the load device which the piston 80 operates have a bias in one direction or the other, suitable alteration of this relationship may be made to suit the existing requirements.

While the form of embodiment of the invention as herein disclosed constitutes a preferred form, it is to be understood that other forms might be adopted, all coming within the scope of the claims which follow.

What is claimed is as follows:

1. In a fluid power transmission system the combination of a fluid motor connected to operate a load device, a pump for supplying fluid, a control element movable in accordance with the desired movements of said load device, a conduit leading from the pump to one side of the fluid motor, means biasing the motor in opposition to the pressure applied at said one side, a first adjustable fluid flow rate controller for regulating the rate of flow from the pump into said conduit, a second adjustable fluid flow rate controller for regulating the rate of flow out of said conduit, each of said controllers comprising an adjustable throttle and a pressure compensating valve for automatically maintaining the flow through the throttle constant irrespective of the pressure differential applied to the controller, and means connecting one of said throttles for adjustment in accordance with the position of the control element and connecting the other of said throttles for adjustment in accordance with the position of the fluid motor whereby the load device will be driven to a position corresponding to any position to which the control element may be moved.

2. In a fluid power transmission system the combination of a fluid motor connected to operate a load device, a pump for supplying fluid, a control element movable in accordance with the desired movements of said load device, means for maintaining a continuous flow of fluid from the pump into one side of said motor at a rate varying with position of the load device and independent of pressure, means biasing the motor in opposition to the pressure applied at said one side, and means for maintaining a continuous flow of fluid out of said motor at a rate varying with the position of the control element and independent of pressure whereby there is no net flow to or from the motor when the position of the load device corresponds to the position of the control element irrespective of externally applied forces acting on the motor.

3. In a device for controlling the position of a movable member from a distance, the combination of a differential piston fluid motor operatively connected with said member, a control element movable in accordance with the desired movements of said member, a control fluid circuit, a pump for supplying fluid to said circuit, a pair of adjustable fluid flow rate controllers arranged in series in said circuit, each of said controllers comprising an adjustable throttle and a pressure compensating valve for automatically maintaining the flow through the throttle constant irrespective of the pressure differential applied to the controller, means connecting the large end of said motor to said circuit between said controllers, means for adjusting one of said throttles in accordance with the position of the control element, means for adjusting the other throttle in accordance with the position of the movable member, and means connecting the small end of said motor to said circuit at the discharge side of the pump.

RALPH L. TWEEDALE.